US011014856B2

(12) United States Patent
Delehouze et al.

(10) Patent No.: US 11,014,856 B2
(45) Date of Patent: May 25, 2021

(54) METHOD FOR PRODUCING A COMPOSITE PART CONTAINING A CERAMIC MATRIX

(71) Applicants: SAFRAN CERAMICS, Le Haillan (FR); CENTRE NATIONAL DE LA RECHERCHE SCIENTIFIQUE, Paris (FR); UNIVERSITE DE BORDEAUX, Bordeaux (FR)

(72) Inventors: Arnaud Delehouze, Moissy-Cramayel (FR); Eric Bouillon, Moissy-Cramayel (FR); Yann Lepetitcorps, Leognan (FR)

(73) Assignees: SAFRAN CERAMICS, Le Haillan (FR); CENTRE NATIONAL DE LA RECHERCHE SCIENTIFIQUE, Paris (FR); UNIVERSITE DE BORDEAUX, Bordeaux (FR)

( * ) Notice: Subject to any disclaimer, the term of this patent is extended or adjusted under 35 U.S.C. 154(b) by 0 days.

(21) Appl. No.: 16/956,068

(22) PCT Filed: Dec. 20, 2018

(86) PCT No.: PCT/FR2018/053475
§ 371 (c)(1),
(2) Date: Jun. 19, 2020

(87) PCT Pub. No.: WO2019/122760
PCT Pub. Date: Jun. 27, 2019

(65) Prior Publication Data
US 2020/0377417 A1 Dec. 3, 2020

(30) Foreign Application Priority Data

Dec. 22, 2017 (FR) ...................................... 1763017

(51) Int. Cl.
*C04B 35/657* (2006.01)
*B28B 1/00* (2006.01)
(Continued)

(52) U.S. Cl.
CPC ............ *C04B 35/657* (2013.01); *B28B 1/008* (2013.01); *B28B 3/006* (2013.01); *C04B 35/573* (2013.01);
(Continued)

(58) Field of Classification Search
CPC ................ C04B 35/657; C04B 35/573; C04B 35/62834; C04B 35/62878; C04B 35/632;
(Continued)

(56) References Cited

U.S. PATENT DOCUMENTS 5,158,916 A * 10/1992 Claussen ............... C04B 35/111
264/639
5,952,100 A * 9/1999 Corman .................. B32B 18/00
428/368

(Continued)

FOREIGN PATENT DOCUMENTS

| DE | 198 20 832 A1 | 10/1999 |
| EP | 0 519 644 A1 | 12/1992 |
| EP | 3 395 564 A1 | 10/2018 |

OTHER PUBLICATIONS

International Preliminary Report on Patentability and the Written Opinion of the International Searching Authority as issued in International Patent Application No. PCT/FR2018/053475, dated Jun. 23, 2020.

(Continued)

Primary Examiner — Noah S Wiese
(74) Attorney, Agent, or Firm — Pillsbury Winthrop Shaw Pittman LLP

(57) ABSTRACT

A process for manufacturing a composite material part including a particulate reinforcement densified by a ceramic (Continued)

matrix, the process including: formation of a blank of the part to be manufactured by shaping a mixture including a binder, first ceramic or carbon particles intended to form the particulate reinforcement of the part and second ceramic or carbon particles distinct from the first particles, removal or pyrolysis of the binder present in the blank to obtain a porous preform of the part to be manufactured, and infiltration of the porosity of the preform by a molten composition including a metal in order to obtain the part.

17 Claims, 1 Drawing Sheet

(51) Int. Cl.
| | |
|---|---|
| B28B 3/00 | (2006.01) |
| C04B 35/573 | (2006.01) |
| C04B 35/628 | (2006.01) |
| C04B 35/632 | (2006.01) |
| C04B 35/638 | (2006.01) |
| C04B 35/80 | (2006.01) |

(52) U.S. Cl.
CPC .. *C04B 35/62834* (2013.01); *C04B 35/62878* (2013.01); *C04B 35/632* (2013.01); *C04B 35/638* (2013.01); *C04B 35/80* (2013.01); *C04B 2235/3813* (2013.01); *C04B 2235/3826* (2013.01); *C04B 2235/3891* (2013.01); *C04B 2235/526* (2013.01); *C04B 2235/604* (2013.01); *C04B 2235/6022* (2013.01); *C04B 2235/616* (2013.01)

(58) Field of Classification Search
CPC ................ C04B 35/638; C04B 35/80; C04B 2235/3826; C04B 2235/604; C04B 2235/616; C04B 2235/5244; C04B 2235/5248
See application file for complete search history.

(56) References Cited

U.S. PATENT DOCUMENTS

| | | | |
|---|---|---|---|
| 6,074,750 A | * | 6/2000 | Brun .................... C04B 35/573 428/366 |
| 9,931,818 B1 | * | 4/2018 | Parolini ................. C04B 35/80 |
| 2002/0165304 A1 | | 11/2002 | Mulligan et al. |
| 2014/0072710 A1 | | 3/2014 | Valle |

OTHER PUBLICATIONS

International Search Report as issued in International Patent Application No. PCT/FR2018/053475, dated Mar. 29, 2019.

Marchais, A., "Capillary infiltration of hexadecane in packed SiC powder and in SiC/SiC preforms: Pore description an calculation of molten Si infiltration," Ceramics International, vol. 42, No. 6, Feb. 2016, XP029461743, pp. 7774-7780.

* cited by examiner

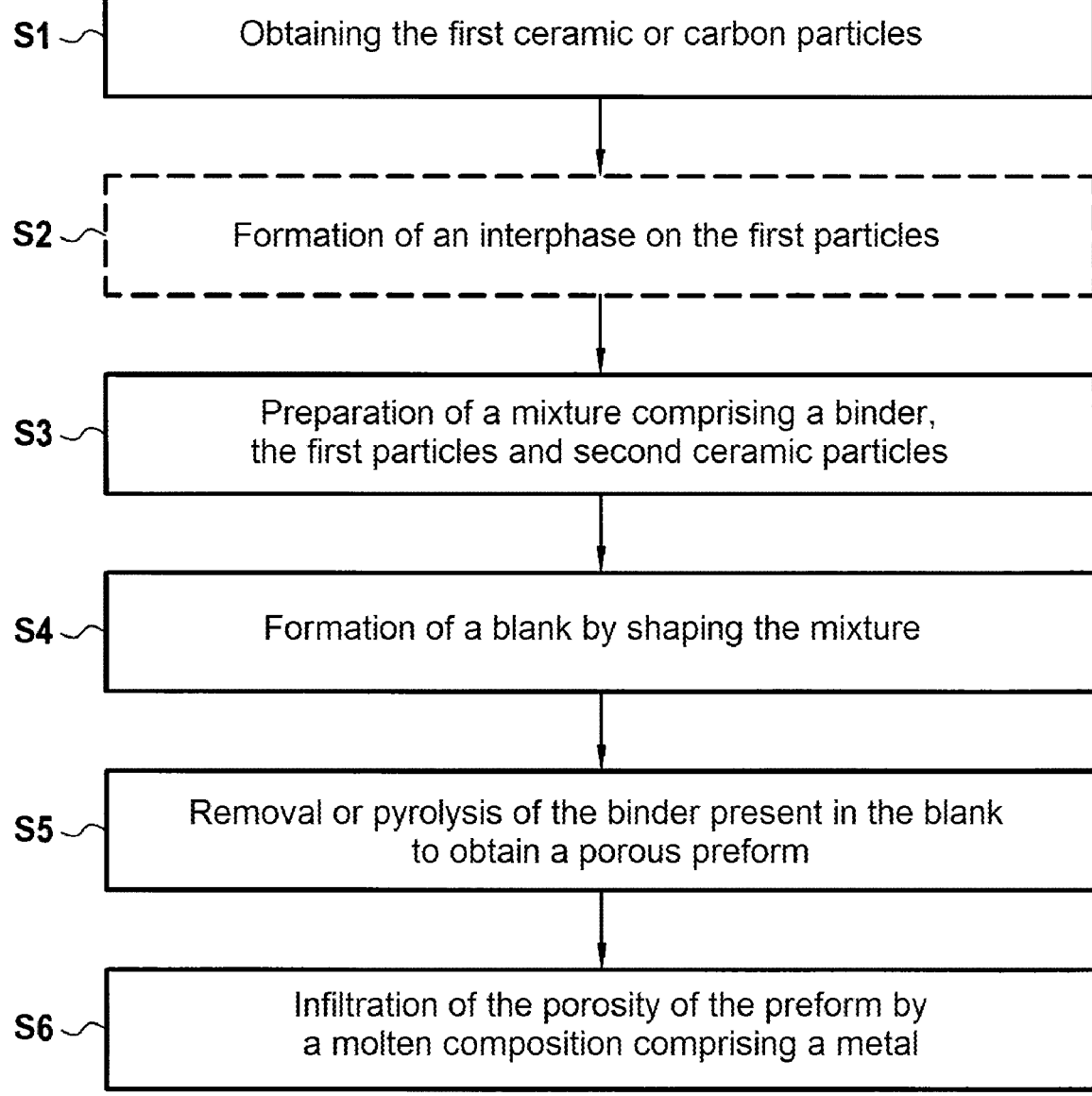

METHOD FOR PRODUCING A COMPOSITE PART CONTAINING A CERAMIC MATRIX

CROSS-REFERENCE TO RELATED APPLICATIONS

This application is the U.S. National Stage of PCT/FR2018/053475, filed Dec. 20, 2018, which in turn claims priority to French patent application number 1763017 filed Dec. 22, 2017. The content of these applications are incorporated herein by reference in their entireties.

BACKGROUND OF THE INVENTION

The present invention relates to the general field of processes for manufacturing parts made of ceramic matrix composite material.

Ceramic matrix composite materials (CMC), known for their good mechanical properties that make them suitable for use as structural elements and for maintaining these properties at high temperatures, are a viable alternative to traditional metal parts. Their reduced mass compared to their metallic equivalent makes them the ideal choice to respond to the problems of increasing efficiency and reducing polluting emissions from engines in the aeronautical field.

CMC parts can comprise a generally continuous fibrous reinforcement in the form of a woven textile, which is densified by a ceramic matrix. The fibrous reinforcement thus comprises continuous long fibers, the orientation of which can be adapted to the main directions of stress of the part during use. The preform to form the fiber reinforcement is woven from the continuous fibers to the dimensions of the part (for example by two- or three-dimensional weaving) using a suitable loom. The weaving step is a long and expensive process, which is not optimal for making small parts.

There is therefore a need for a process for manufacturing a ceramic matrix composite part that is easier to implement and less expensive to manufacture small parts.

SUBJECT MATTER AND SUMMARY OF THE INVENTION

The main purpose of the present invention is therefore to compensate for such disadvantages by proposing a process for manufacturing a composite material part comprising a particulate reinforcement densified by a ceramic matrix, the process comprising the following steps:
formation of a blank of the part to be manufactured by shaping a mixture comprising a binder, first ceramic or carbon particles for forming the particulate reinforcement of the part and second ceramic or carbon particles distinct from the first particles,
removal or pyrolysis of the binder present in the blank to obtain a porous preform of the part, and
infiltration of the porosity of the preform by a molten composition comprising a metal in order to obtain the part.

The process according to the invention thus makes it possible to produce a CMC part by a melt infiltration process without woven fibrous reinforcement. Thanks to a step of shaping the mixture filled with the first particles and the second particles and then obtaining the porous preform by removal or pyrolysis of the binder, the process according to the invention makes it possible to dispense with the step of weaving the fibrous reinforcement. This is advantageous in particular for manufacturing small parts which are not subject to high thermo-mechanical stress, which represents savings in terms of manufacturing time and costs. It is also possible to obtain parts from the process according to the invention which have complex shapes and the desired dimensions without the need for additional machining.

The mixture can be homogeneous and intimate between the binder and the particles.

In one example embodiment, the molten composition can include an intermetallic compound. In an example embodiment, the molten composition can include silicon. The molten composition can consist of pure molten silicon or alternatively be in the form of a molten alloy of silicon and one or more other constituents. The molten composition can consist predominantly of silicon by mass, i.e. have a silicon content of 50% or more by mass. The molten composition can, for example, have a silicon content greater than or equal to 75% by mass. The constituent(s) present in the silicon alloy can be selected from B, Al, Mo, Ti, and mixtures thereof. In particular, the molten composition can include molybdenum disilicide ($MoSi_2$). A chemical reaction can occur between the molten composition and carbon present in the porous preform (for example pyrolysis residue) during infiltration, resulting in the formation of silicon carbide (reactive melt infiltration process).

In an example embodiment, the mixture can be heated to fluidize the binder and facilitate the shaping step to form the blank. The mixture can also be subjected to a vacuum to remove any air bubbles present in the mixture prior to forming. The blank can be larger or equal in size to the final part in order to leave a porous network inside the blank after removal or pyrolysis of the binder. The binder removal or pyrolysis step (also called "debinding") can preferably be carried out under inert gas, for example under argon, to avoid oxidation of the blank which would reduce the mechanical strength of the blank between the different processing steps leading to the final part. In the following, when reference is made to the "binder removal" step, it is always understood to mean the "binder removal or pyrolysis" step, where pyrolysis consists of the removal of the binder leaving residues.

In an example embodiment, the first particles can be short fibers. In other words, the first particles can have a generally cylindrical shape.

In an example embodiment, the short fibers can preferentially have a length comprised between 50 µm and 5000 µm, or more preferentially the short fibers can have a length comprised between 100 µm and 300 µm.

In an example embodiment, the short fibers can be obtained from long fibers by mechanical cutting or grinding.

In an example embodiment, the first particles can be grains. In other words, the first particles can be spherical or ellipsoidal in shape. In this case, the average size (D50) of the first particles can be comprised between 10 µm and 300 µm, more preferentially between 40 µm and 100 µm.

In an example embodiment, the median elementary volume of the first particles can be greater than or equal to the median elementary volume of the second particles. The elementary volume of a particle is the volume occupied by the particle.

In an example embodiment, the shaping of the mixture can involve injecting the mixture into a mold.

In an example embodiment, the binder can comprise at least one thermoplastic polymer. For example, the binder can comprise at least one compound selected from the following: polyvinyl alcohol (PVA), polyethylene glycol (PEG), polypropylene (PP), polyoxymethylene (POM), polyethylene terephthalate (PET).

In an example embodiment, the binder can include at least one thermosetting polymer. For example, the binder can comprise at least one compound selected from the following: epoxy resins, phenolic resins, pre-ceramic resins.

In an example embodiment, the mixture can comprise two thermally removable binders, each with a different removal temperature. Thus, the binder removal step can include two sub-steps of thermal removal of each of the binders at two different temperatures.

In an example embodiment, the mixture can comprise a first binder that can be removed by dissolution and a second binder that can be removed thermally. Thus, the binder removal step can include two removal sub-steps: removal by dissolution of the first binder, and then thermal removal of the second binder. This arrangement is advantageous because it allows more efficient removal of the second binder by opening up porosity in the blank after the dissolution removal of the first binder.

In an example embodiment, a liquid medium comprising the mixture can be injected into the mold, the mold can be equipped with a filtration device for the liquid medium, and the step of forming the blank can additionally include the filtration of the liquid medium by the filtration device. The liquid medium can be an aqueous medium, or can include, for example, an alcohol.

In an example embodiment, the shaping of the mixture can involve applying pressure to the mixture. In this case, the binder includes a plasticizer to improve the compaction of the mixture. Such a plasticizer can be stearic acid. In this case, shaping of the mixture can involve cold isostatic compression of the mixture into a mold.

In an example embodiment, the process can include, prior to the infiltration step, the isostatic compression of the porous preform obtained after removal or pyrolysis of the binder. This isostatic compression step can be carried out either hot or cold. This isostatic compression step makes it possible to partially close the porosity generated by the binder removal or pyrolysis step in order to control this porosity and facilitate the subsequent infiltration step.

It is also possible to carry out, before the infiltration step, a free (i.e. stress-free) sintering heat treatment of the debound blank, again in order to control the porosity of the debound blank. This free sintering heat treatment can be carried out after a cold isostatic compression step and before a hot isostatic compression step.

In an example embodiment, the first particles can be made of silicon carbide. In the case of short fibers, they can then have an oxygen content of less than or equal to 1 atomic percent. For example, such short fibers can be Hi-Nicalon type S fibers marketed by the Japanese company NGS. Alternatively, the short fibers can be made of a material selected from the following: carbon, an oxide, for example alumina ($Al_2O_3$).

In an example embodiment, the first particles can be coated with an interphase. Such an interphase can for example be made of pyrolytic carbon (PyC), boron nitride (BN) or silicon carbide (SiC). The interphase can comprise several layers, each of which comprises a different material. The interphase has a function of reducing the fragility of the composite material which promotes the deflection of possible cracks reaching the interphase after having propagated in the matrix, preventing or delaying the rupture of the reinforcement by such cracks. This interphase also protects the first particles of the matrix material during its formation.

This interphase can be deposited on the first particles before their introduction into the mixture. In the case of short fibers, the interphase can be deposited on long fibers before they are cut or ground. The interphase can be deposited directly on the short fibers by a chemical vapor deposition (CVD) process or by an electrolytic deposition process or by molten salt. It is also possible to deposit, instead of the interphase or on the interphase, a ceramic coating compatible with the matrix material to be formed.

In an example embodiment, the second ceramic particles can be made of a material selected from the following: SiC, MoSi2, $TiSi_2$, $CoSi_2$, $ZrSi_2$, $HfSi_2$, $ZrB_2$, $HfB_2$, $TiB_2$, and a mixture thereof.

In an example embodiment, the volume content of first particles in the part can be comprised between 10% and 70%, preferentially between 25% and 50%.

In an example embodiment, the volume content of second particles in the part can be comprised between 30% and 90%, preferentially between 50% and 75%.

In an example embodiment, the second particles can have an average size (D50) comprised between 0.5 µm and 200 µm, more preferentially comprised between 0.7 µm and 75 µm.

BRIEF DESCRIPTION OF THE DRAWINGS

Other features and advantages of the present invention will be apparent from the description given below, with reference to the appended drawing, which illustrates an example embodiment free of any limiting character.

FIG. 1 is a flowchart showing the various steps of a process according to an embodiment of the invention.

DETAILED DESCRIPTION OF THE INVENTION

The steps of a process according to an embodiment of the invention will now be described in connection with the flowchart in FIG. 1. Here the aim is to obtain a ceramic matrix composite part. Such a part can be an aeronautical part, for example a part intended for use in an aeronautical turbomachine. Such a part can be, for example, a small blade.

In a step S1, the first ceramic or carbon particles can be obtained which will be used to form the particulate (for example fibrous) reinforcement of the part to be manufactured. When the first particles are short fibers, they can be obtained by grinding or mechanically cutting long fibers in a manner known per se. Short fibers can have a median length comprised between 50 µm and 5000 µm or between 100 µm and 300 µm. The size distribution of the first particles does not have to be monodisperse but can be polydisperse.

The first particles can optionally be coated with an interphase coating (step S2). In the case of short fibers, they can be coated either directly or by coating long fibers prior to cutting or grinding. The thickness of the interphase can for example be comprised between 10 nm and 1000 nm, and for example between 10 nm and 500 nm. The interphase can be single or multilayer. The interphase can comprise at least one layer of pyrolytic carbon (PyC), boron nitride (BN), silicon-doped boron nitride (BN(Si), with silicon in a mass proportion of between 5% and 40%, the balance being boron nitride) or boron-doped carbon (BC, with boron in an atomic proportion of between 5% and 20%, the balance being carbon). Deposition of the interphase can be carried out directly on the short fibers by a CVD process or by an electroplating process or by molten salt. The interphase has here a function of defragilisation of the composite material which promotes the deflection of possible cracks reaching the interphase after having propagated in the matrix, preventing or delaying the rupture of the reinforcement by such cracks. The interphase can also protect the reinforcement during the later step of matrix formation. It is also possible to deposit, instead of the interphase or on top of the interphase, a ceramic coating compatible with the matrix material to be formed, for example by CVI.

In a step S3, a mixture comprising a binder, first ceramic or carbon particles and second ceramic particles to form the matrix of the part can then be prepared. The binder can, for example, comprise a polymer, such as a thermoplastic or thermosetting resin, or a plasticizer. The mixture can include several binders. It can be advantageous to heat the mixture in order to fluidize the binder to facilitate mixing and allow better homogenization. The mixing temperature then depends on the organic binders used in order to avoid thermal degradation and premature polymerization. It is also possible to prepare the mixture under vacuum in order to reduce the presence of air bubbles in the mixture. The mixture thus prepared can, for example, be made into granules for later use, or be injected directly in the next step.

In a step S4, a blank of the part is formed by shaping the mixture prepared in step S3. Several ways of carrying out this step will be described below.

According to a first alternative, the shaping step can be carried out by injecting the mixture into the mold cavity. The cavity of the mold used for the injection can have larger dimensions than those of the final part because a poral network is necessary to efficiently carry out the infiltration step (step S6). The mold can include injection nozzles whose dimensions are adapted, in a known way, to the size of the first and second particles, as well as to the binder and the chosen injection pressure and temperature. The mold can be temperature-controlled in order to control the possible solidification of the binder after injection, if necessary. This control can also be used to avoid preferential orientation of the first particles when they correspond to short fibers in the vicinity of the mold wall. Injection can be carried out with a mixture previously heated to a temperature that allows the binder to fluidify. Injection can be carried out at a pressure between 50 bars and 3000 bars. Once the mixture has been injected into the mold and the blank molded, the blank can be demolded. The resulting blank is in a "green" or plastic state. The blank can usually be larger than the final part, as explained above.

In a second alternative, the mold can be equipped with a filtration device and a liquid medium comprising the mixture of first and second particles dispersed in the liquid medium is injected into the mold, and the step S4 of forming the blank further comprises filtering the liquid medium by the filtration device. The liquid medium can be an aqueous medium or comprise alcohol. The liquid medium can preferentially include polyvinyl alcohol (PVA). It can be a slurry. During injection/filtration, the first and second particles are retained inside the mold by the filtration device and gradually form the blank.

In a third alternative, the binder can include a plasticizer and the binder shaping step includes the application of pressure to the mixture, such as cold isostatic compression of the mixture. The plasticizer to promote compaction can be stearic acid. The mixture can then be placed directly into a mold and pressure can be applied to the mixture by the mold to shape the mixture.

In a step S5, the binder in the blank is removed or pyrolyzed to produce a debound blank. The conditions of the binder removal or pyrolysis step S5 generally depend on the nature of the binder to be removed in a manner known per se. In particular, some binders can be removed thermally, i.e. the temperature allows them to be decomposed and/or evaporated, while others can be removed chemically, for example by dissolution in a suitable solvent. Step S5 can involve pyrolysis, in which case pyrolysis residues can remain within the debound blank. Step S5 can be carried out in a neutral atmosphere, for example argon, in order to keep a carbon skeleton in the blank until the end of the removal step, thus ensuring a better holding of the blank, but also to reduce the risk of oxidation of the blank.

It can be advantageous to use several binders, for example two binders that can be removed in two separate removal steps. In one example, a first binder is removed first by dissolution and then a second binder is removed thermally. In another example, a first binder can be removed thermally at a first removal temperature, and a second binder can be removed thermally at a second removal temperature higher than the first removal temperature. Removal of the two binders in succession reduces the risk of cracking of the preform during step S5 by opening, after removal of the first binder, a porosity in the preform through which the second binder can be extracted from the preform. The dimensions of the preform do not generally change following the debinding step S5. The debound blank or porous preform thus comprises the first particles and the second particles and has a non-zero porosity which was previously occupied by binder.

Then, in a step S6, the porosity of the preform is infiltrated with a molten composition comprising a metal, for example an intermetallic compound or silicon, to obtain the part. This infiltration step corresponds to a melt infiltration step (MI or RMI process). The molten composition or infiltration composition can consist of pure molten silicon or alternatively be in the form of a molten alloy of silicon and one or more other constituents. After step S6, the CMC part is obtained.

A step of hot isostatic compression of the porous preform is carried out after step S5 of removal or pyrolysis of the binder present in the blank and before step S6 of infiltration in order to close part of the porosity if it is too high before step S6. This hot isostatic compression step is preferably carried out under a jacket to ensure homogeneous compaction of the porous preform. The pressure applied is preferably comprised between 1000 bars and 2000 bars. The jacket can include graphite and boron nitride. This step can reduce the porosity of the debound blank, generally between 30% and 40%, to a porosity of the order of 10% for example, in order to keep a sufficient connected poral network and to have a porosity ensuring a better capillary rise of the molten metal in the preform. In addition, this hot isostatic compression step carried out prior to infiltration makes it possible to reduce the volume of liquid metal that can react during infiltration with the reinforcement, thus protecting the reinforcement by reducing the risk of dissolution of the latter by the liquid metal. The hot isostatic compression step can be carried out at a temperature comprised between 1000° C. and 1600° C., depending on the matrix material involved. For a titanium disilicide matrix, the temperature can be comprised between 1100° C. and 1500° C., for example.

The invention claimed is:

1. A process for manufacturing a composite material part comprising a particulate reinforcement densified by a ceramic matrix, the process comprising:

forming a blank of the part to be manufactured by shaping a mixture comprising a binder, first ceramic or carbon particles intended to form the particulate reinforcement of the part and second ceramic or carbon particles distinct from the first particles, removing or pyrolyzing the binder present in the blank to obtain a porous preform of the part, and infiltrating the porosity of the preform by a molten composition comprising a metal in order to obtain the part, wherein the process further comprises, before the infiltrating, a step of hot isostatic compression of the porous preform obtained after removal or pyrolysis of the binder.

2. The process as claimed in claim 1, wherein the molten composition comprises silicon.

3. The process as claimed in claim 1, wherein the first particles are short fibers having a length comprised between 50 μm and 5000 μm.

4. The process as claimed in claim 3, wherein the short fibers have a length comprised between 100 μm and 300 μm.

5. The process as claimed in claim 1, wherein the first particles are grains.

6. The process as claimed in claim 1, wherein the median elementary volume of the first particles is greater than or equal to the median elementary volume of the second particles.

7. The process as claimed in claim 1, wherein shaping the mixture comprises injecting the mixture into a mold.

8. The process as claimed in claim 7, wherein a liquid medium comprising the mixture is injected into the mold, the mold being equipped with a filtration device for the liquid medium, and the step of forming the blank further comprises the filtration of the liquid medium by the filtration device.

9. The process as claimed in claim 1, wherein shaping the mixture comprises the application of pressure to the mixture.

10. The process as claimed in claim 9, wherein shaping the mixture comprises cold isostatic compression of the mixture into a mold.

11. The process as claimed in claim 1, wherein the first particles are silicon carbide.

12. The process as claimed in claim 1, wherein the first particles are coated with an interphase.

13. The process as claimed in claim 1, wherein the second ceramic particles comprise a material selected from the following: SiC, $MoSi_2$, $TiSi_2$, $CoSi_2$, $ZrSi_2$, $ZrB_2$, $HfB_2$, $TiB_2$, and a mixture thereof.

14. The process as claimed in claim 1, wherein the volume content of first particles in the part is comprised between 10% and 70% and/or wherein the volume content of second particles in the part is comprised between 30% and 90%.

15. The process as claimed in claim 1, wherein the part is a part for use in an aeronautical turbomachine.

16. The process as claimed in claim 1, wherein the porous preform has a porosity of at least 30% before the step of hot isostatic compression.

17. The process as claimed in claim 1, wherein the step of hot isostatic compression is carried out to reduce a porosity of the porous preform, before the infiltrating, at least by a factor 2.

* * * * *